3,751,408
IMIDAZOLE-RIBOSYL CYCLOPHOSPHATE COMPOUNDS AND THERAPEUTIC COMPOSITIONS
Hans Ulrich Bergmeyer, Gerhard Michal, and Michael Nelboeck-Hochstetter, Tutzing, Upper Bavaria, Harald Stork, Mannheim-Feudenheim, and Gunter Weimann, Percha, Upper Bavaria, Germany, assignors to Boehringer Mannheim GmbH, Mannheim, Germany
No Drawing. Filed May 21, 1971, Ser. No. 145,913
Claims priority, application Germany, May 27, 1970, P 20 26 040.6
Int. Cl. C07d 51/52
U.S. Cl. 260—211.5 R         7 Claims

ABSTRACT OF THE DISCLOSURE

Certain novel imidazole-ribosyl cyclophosphate compounds of the general formula:

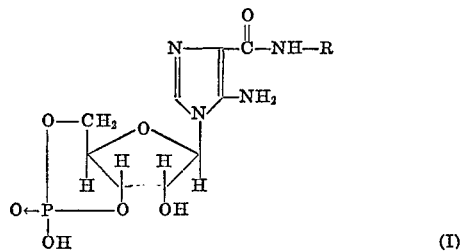

wherein

R is a hydrogen atom or a $(CH_2)_n$—A radical, in which $n$ is 2 or 3
A is a sulfo or COR' group and
R' is hydroxyl, alkoxy containing from 1 to 6 carbon atoms or propionamido;

and the salts thereof are outstandingly effective anti-hyperlipemic agents and, particularly, as anti-cholesterol agents.

---

The present invention is concerned with new imidazole-ribosyl cyclophosphate compounds and with the preparation thereof and is also concerned with pharmaceutical compositions containing these new cyclophosphate compounds.

The novel imidazole-ribosyl cyclophosphates according to the present invention are compounds of the general formula:

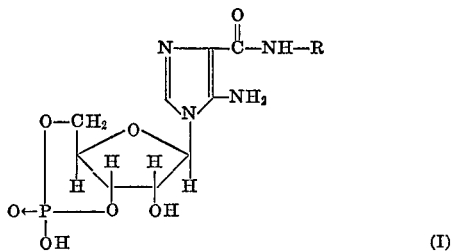

wherein R is a hydrogen atom or a $(CH_2)_n$—A radical, in which $n$ is 2 or 3, A is a sulfo or COR' group and R' is hydroxyl, alkoxy containing from 1 to 6 carbon atoms or a propionamido radical and the salts thereof.

The new Compounds I are cyclophosphate derivatives of 5-amino-1β-D-ribosyl-4-imidazole carboxamide, in which the carboxamido group is present possibly replaced by one of the above-given substituents. The phosphoric acid-free fundamental structure in which R is a hydrogen atom, is known as an intermediate of the biological purine-ribosyl synthesis under the abbreviation AICAR. Therefore, for the sake of simplicity, the new compounds according to the present invention are hereinafter referred to as AICAR-3':5'-cyclophosphates or -3':5'-monophosphates (AICAR-3':5'-MP).

Examples of new compounds according to the present invention include

AICAR-3':5'-monophosphate (R=H),
carboxyethyl-AICAR-3':5'-monophosphate
  (R=$(CH_2)_2$—COOH),
sulfoxyethyl-AICAR-3':5'-monophosphate
  (R=$(CH_2)_2$—$SO_3H$),
carboxypropyl-AICAR-3':5'-monophosphate
  (R=$(CH_2)_3$—COOH),
carboxyethylmethylate-AICAR-3':5'-monophosphate
  (R=$(CH_2)_2$—$COOCH_3$),
carboxyethylhexylate-AICAR-3':5'-monophosphate
  (R=$(CH_2)_2$—COO-hexyl),
propionamido-carboxyethyl-AICAR-3':5'-monophosphate (R=$(CH_2)_2$—$CONHC_3H_7$),
carboxypropylmethylate-AICAR-3':5'-MP,
carboxypropylhexylate-AICAR-3':5'-MP and
propionamidocarboxypropyl-AICAR-3':5'-MP.

The Compounds I according to the present invention can be prepared from inosine-3':5'-monophosphate or a derivative thereof acylated in the 2'-position by splitting the purine ring to give the corresponding 4-imidazole-5-amino-carboxamide derivative. In the case of those Compounds I in which R is other than a hydrogen atom, inosine-3':5'-monophosphate is reacted with a compound of the general formula:

wherein $n$ has the same meaning as above and X is a >CO or >$SO_2$ group, whereafter the product obtained is heated with an aqueous solution of an alkali metal hydroxide and the carboxylic acid thus obtained is, if desired, esterified or converted into an unsubstituted or substituted amide.

The compound of the general Formula II are lactones or sultones, for example, propiolactone, butyrolactone, propiosultone or butyrosultone.

The first step of the process according to the present invention is expediently carried out at a temperature between 0 and 50° C., preferably at ambient temperature, the reaction being carried out in an inert solvent, preferably dioxan.

The second step of the process according to the present invention is preferably carried out by heating in an aqueous solution of an alkali metal hydroxide. The period and temperature of the reaction depend upon the concentration of the alkali metal hydroxide employed, which can be between about 0.2 and 5.0 N, preferably 0.5 to 2 N.

Purification of the product obtained is expediently carried out on an anion exchanger, for example, a weakly basic anion exchanger.

For the preparation of the compound of general Formula I, in which R is a hydrogen atom, inosine-3':5'-monophosphate-2'-O-acetyl is reacted in a polar organic solvent first with a metal hydride in an at least equimolar amount and then with chlorodimethyl ether and the N-1-methoxymethyl-inosine-2'-O-acetyl-3':5'-monophosphate thus obtained is heated with an alkali metal hydroxide solution.

Dimethyl formamide is preferably used as solvent. As metal hydride, there can be used any of the metal hydrides usually employed for hydrogenations, for example, lithium hydride, lithium aluminum hydride or potassium hydride, sodium hydride being preferred. The reaction with the metal hydride and with the chlorodimethyl ether is expediently carried out at a temperature between 0 and 50° C., preferably at ambient temperature.

The alkaline heating, in which the ring opening takes place, is expediently carried out in a lower alcohol or ketone as solvent. The hydrolysis is preferably carried out by heating under reflux.

Purification of the product obtained can be carried out by the usual purification processes, chromatography over an ion exchanger being preferred.

Alternatively, the compound of general Formula I in which R is a hydrogen atom can be prepared by dissolving AICAR-5'-phosphate, together with morpholino-N,N-dicyclo hexylcarboxamidinium salt, in a pyridine-water mixture, whereafter the water is removed and the solution obtained reacted at an elevated temperature with at least 2 mole equivalents of dicyclohexylcarbodiimide. The water is preferably removed by evaporation and the reaction carried out at the boil.

Purification of the product obtained expediently takes place by separation of the dicyclohexylurea formed as by-product from the concentrated aqueous solution, followed by purification over an ion exchanger.

The new compounds according to the present invention possess interesting pharmacological properties. In particular, they influence the lipolysis in that they show an outstanding anti-lipolytic action: when administered, they bring about a marked sinking of the content of free fatty acids, as well as of the total glycerol, in the blood. An action of this kind is not exhibited by the chemically related known compound AICAR.

The anti-lipolytic action manifests itself not only in vitro but also in vivo, without an activation of lipolysis being observed, which usually occurs in the case of known anti lipolytic substances.

Those substances are called anti-lipolytically active which are able to inhibit naturally-occurring lipolysis, which bring about a sinking of the lipid concentration in the blood. This action is therapeutically and prophylactically of great interest due to the inhibition of arteriosclerosis.

An anti-lipolytic action had previously been observed in the case of quite a number of nucleosides, especially adenosine. When these nucleosides are converted into the corresponding nucleotides, the anti-lipolytic action is usually lost. Only exceptionally was it found that the nucleotide also still exhibited an anti-lipolytic action, even though very much reduced.

In contradistinction thereto, the nucleosides from which the nucleotides according to the present invention are derived exhibit no anti-lipolytic action whatsoever so that the anti-lipolytic action of the new compounds according to the present invention is extremely surprising and is to be attributed to an action mechanism which is different from that of the previously known anti-lipolytically active nucleosides or related nucleotides. In the case of the previously known anti-lipolytically active substances, an effect took place in the conversion of adenosine triphosphate, by means of adenyl cyclase, into adenosine-3:5-cyclophosphate. In the case of simultaneous activation with adenosine-3:5-cyclophosphate, lipolysis inhibition no longer occured. In contradistinction thereto, the new compounds according to the present invention also act anti-lipolytically in the case of simultaneous activation with adenosine-3:5-cyclophosphate and can, therefore, also be used as a medicament in those cases in which the previously known anti-lipolytically active nucleosides and nucleotides were ineffective. The action of the new compounds according to the present invention in this regard is to be attributed to the fact that they influence the conversion of inactive lipase into active lipase controlled by adenosine-3:5-cyclophosphate.

Lipolysis was measured in vitro in Rizack's homogeneous system (J. Biol. Chem. 239, 392/1964), as well as in isolated fat cells by Rodbell's method (J. Biol. Chem. 299, 375/1964). By the addition of $5.10^{-6}$ M $N^6$, 2'-O-dibutyryl-adenosine-3':5'-monophosphate (in the case of the Rizack system) or of 1 $\mu$g./ml. adrenaline (in the case of the Rodbell system), lipolysis was maximally activated. The fatty acids liberated in the course of 30 minutes were extracted and titrated according to the method of Dole and Meinertz (J. Biol. Chem. 235, 2595/1960). An anti-lipolytic action was ascertained by reduction of the rate of lipolysis.

The following Table I shows by how many percent the lipolysis velocity is reduced by the addition of the new compounds according to the present invention, the lipolysis stimulated by $N^6$,2'-O-dibuturyl-A-3':5'-MP or adrenaline being given as 100% and the spontaneous lipolysis as blank being given as 0%.

TABLE I (a) Rizack system:

| Substance | $10^{-7}$ M, percent | $10^{-6}$ M, percent |
|---|---|---|
| AICAR-3':5'-monophosphate | 95 | 60 |
| For comparison, AICAR | 100 | 100 |

(b) Rodbell system:

| Substance | $10^{-6}$ M, percent | $10^{-5}$ M, percent | $10^{-4}$ M, percent |
|---|---|---|---|
| AICAR-3':5'-monophosphate | 100 | 100 | 40 |
| Carboxyethyl-AICAR-3':5'-monophosphate | 20 | 20 | 20 |
| Carbomethoxyethyl-AICAR-3':5'-monophosphate | 85 | 70 | 32 |

The anti-lipolytic effectiveness of the new compounds according to the present invention indicate their use as medicaments, especially in those cases in which the previously known anti-lipolytic substances are inactive.

Accordingly, the present invention also provides pharmaceutical compositions comprising at least one of the new Compounds I in admixture with a solid or liquid pharmaceutical diluent or carrier.

The following examples are given for the purpose of illustrating the present invention:

EXAMPLE 1

AICAR-3':5'-monophosphate (A) 4.8 mmole (1.625 g.) AICAR-5'-phosphoric acid, together with 4.8 mmole (1.4 g.) morpholino-N,N-dicyclohexylcarboxamidinium salt, were dissolved in 15 ml. pyridine and 2 ml. water. The solution obtained was evaporated, the residue was mixed with 15 ml. pyridine and again evaporated to dryness and this procedure repeated twice, whereafter the residue was dissolved in 500 ml. water-free pyridine.

(B) 500 ml. pyridine were placed in a 2 liter flask, 9.6 mmole (2 g.) dicyclohexylcarbodiimid were added thereto and the mixture heated to reflux. The solution obtained according to A above was then added dropwise over the course of 3.5 hours and the clear reaction solution further boiled for another 3 hours.

The pyridine was then distilled off almost completely, the residue was mixed with 50 ml. water, filtered off with suction from precipitated dicyclohexylurea and the filter residue washed 3 times with water. After again evaporating, filtering and extracting with ether, the aqueous phase was applied to "Dowex" 1 X 2 in formate form and eluted with dilute formic acid. The acidic eluate was evaporated, crystalline AICAR-3':5'-MP (I; R=H) thereby separating out. The crystals are centrifuged off, washed twice with 1 ml. amounts of ice-cold water and then once with alcohol and dried over phosphorus pentoxide in a vacuum. There were thus obtained 275 mg. (18% of theory) of AICAR-3':5'-monophosphate in the form of a pale pinkish crystalline product which melted, after brown coloration, at 239° C. (decomp.). Molecular weight: 319.2.

*Elementary analysis.*—Calcd. for $C_9H_{12}O_7N_4P$ (percent): C, 33.9; H, 3.8; N, 17.5; P, 9.7. Found (percent): C, 33.7; H, 4.0; N, 17.2; P, 9.4.

EXAMPLE 2

AICAR-3':5'-monophosphate (a) Preparation of 2'-O-acetyl-inosine-3':5'-monophosphate.—10 g. inosine-3':5'-monophosphate in the form of the free acid were dissolved in a mixture of 300 ml. pyridine, 8.5 g. triethylamine and 18.7 g. acetic anhydride and the reaction mixture subsequently shaken for 3 hours at ambient temperature. The yellow solution was concentrated to an oily residue, mixed with about 200 g. ice and subsequently evaporated to dryness. This process was repeated twice with 100 g. amounts of ice. The residue was taken up in about 300 ml. water, extracted with ether, clarified over "kristalltheorite" and subsequently lyophilised. The substance obtained was dried in a vacuum over phosphoric pentoxide.

Yield: 14.4 g. inosine-3':5'-monophosphate-2'-O-acetyltriethylammonium salt (100% of theory).

(b) Reaction of 2'-O-acetyl-inosine-3':5' - monophosphate with sodium hydride and chlorodimethyl ether.— 14.4 g. (30.5 mmole) 2'-O-acetyl-inosine-3':5'-monophosphate (M.W. 471) were dissolved in 300 ml. dimethyl formamide and stirred with 1.6 g. (30.5 mmole+10% excess) sodium hydride (50% oil dispersion) for 3 hours at ambient temperature. Subsequently, the dimethyl formamide phase was mixed with 49 g. chlorodimethyl ether and stirred for 15 hours at room temperature. The chromatogram (Leloir mixture, pH 7) showed quantitative reaction to give $N^1$ - methoxymethyl-inosine-3':5'-monophosphate. The reaction mixture was subsequently evaporated to dryness under oil pump vacuum at a bath temperature of 50° C. The oily residue was mixed with 200 ml. 2 N potassium hydroxide and subsequently the solution was boiled under reflux for 30 minutes, whereby ring fission takes place with elimination of the methoxymethyl radical and of the carbon atom in the 2-position.

The hot, alkaline solution was immediately mixed with about 200 ml. water, cooled and adjusted to a pH of 3 to 4 with Dowex-50 H⁺ exchanger. The ion exchanger was filtered off with suction and washed extinction-free with water, whereafter the combined filtrates were highly concentrated.

The concentrate obtained was subsequently desalinated at pH 4 to 5 over a charcoal column and eluted with ethanol/water/ammonia (10:10:0.06). The concentrated eluate was subsequently chromatographed on Dowex 1 X 2 in formate form (50 to 100 mesh, 250 ml. exchanger volume). The impurities were washed out with 0.05 and 0.1 N formic acid. AICAR-3':5'-monophosphate was then eluted from the column with 0.5 N formic acid. The eluate was concentrated to 30 to 50 ml., mixed with about 20 ml. alcohol and left to crystallise out overnight at 4° C. in a refrigerator. The crystals were filtered off with suction and dried at ambient temperature under oil pump vacuum.

Yield: about 5 g. AICAR-3':5'-monophosphate in the form of the free acid (54% of theory).

The product was identical with that obtained according to Example 1.

EXAMPLE 3

Carboxyethyl-AICAR-3':5'-monophosphate 500 mg. (1.4 mmole) inosine-3':5'-monophosphate (free acid) were neutralized with a dilute aqueous potassium hydroxide solution and, in a mixture of 15 ml. potassium carbonate and 15 ml. dioxan, mixed, with stirring, with 1.5 ml. propiolactone and stirred for 6 hours at ambient temperature. Subsequently, the reaction mixture was adjusted to pH 3 with perchloric acid and precipitated potassium perchlorate was filtered off and washed with 95% ethanol. The filterate and wash solution were evaporated and the residue was taken up with 15 ml. water, the pH value was adjusted to 7 with 1 N potassium hydroxide solution and the same volume of 1 N potassium hydroxide solution added. Subsequently, the reaction mixture was heated for 30 minutes at 100° C. and adjusted to pH 7 with Dowex 50 H⁺. As a rule, the reaction was almost quantitative. For after-purification, the solution was applied to a DEAE-Sephadex column (25×2.5 cm.) in the acetate form and eluted with a linear gradient of 1 liter water and 1 liter 0.5 M ammonium acetate of pH 6. After a few smaller pre-peaks, there followed the main peak, which contained about 90% of the total UV-absorbing material. After desalination by absorption on active charcoal and elution with ethanol/water/ammonia (50:50:1), there were obtained 450 mg. (about 90% of theory) of chromatographically pure carboxyethyl AICAR-3':5'-monophosphate ammonium salt (I; n=2; A=COR'; R'=OH). The following Table II shows the properties of this compound.

The process was repeated with the use of propiosulphone and butyrolactone instead of propiolactone, the corresponding sulfoxypropyl or carboxypropyl compounds thereby being obtained.

EXAMPLE 4

Carbomethoxy-ethyl-AICAR-3':5'-monophosphate $10^4$ extinction units (at 268 nm.) of carboxyethyl-AICAR-3':5'-monophosphate pyridinium salt were rendered water-free under oil pump vacuum twice with 20 ml. dry pyridine. The residue was dissolved in 10 ml. dry methanol and 550 mg. dicyclohexylcarbodiimide were added. After 2 hours at ambient temperature, 25 ml. water added and, after standing for 30 minutes at ambient temperature, the reaction mixture was extracted with ether and the aqueous phase filtered clear. The product is converted over Dowex 50 in the sodium form into the sodium salt and subsequently freeze dried.

Yield: 350 mg. (about 94% of theory) carbomethoxy-ethyl-AICAR-3':5'-monophosphate (I; n=2; A=COR'; R'=OCH₃).

The following Table II shows the properties of this compound.

EXAMPLE 5

Propionamidocarboxyethyl-AICAR-3':5'-monophosphate 250 mg. carbomethoxy-ethyl-AICAR-3':5'-monophosphate were treated at ambient temperature for 2 hours with 1 ml. n-propylamine and 30 mg. n-propylamine hydrochloride. The resultant propionamido derivative was purified on Whatman No. 3 MM paper using, as eluent, isopropanol/water/ammonium (7:2:1). There was thus obtained propionamidocarboxyethyl-AICAR-3':5'-monophosphate (I; n=2; A=COR'; R'=propionamido). The following Table II shows the properties of this compound.

TABLE II

| Compound | Neutral 0.05 M PP Max. | Neutral 0.05 M PP Min. | Acidic 0.1 N HCl Max. | Acidic 0.1 N HCl Min. | Alkaline 0.1 N NaOH Max. | Alkaline 0.1 N NaOH Min. | UV quotients Neutral 250/260 | Neutral 280/260 | Neutral 290/260 | Acidic 250/260 | Acidic 280/260 | Acidic 290/260 | Electrophilic mobility | Chromat in Solvent A |
|---|---|---|---|---|---|---|---|---|---|---|---|---|---|---|
| Carboxyethyl-AICAR-3':5'-MP | 262.5 | 225. | 265 / 245 | 254 / 220 | 264 | 222.5 | 50.81 | 0.54 | 0.14 | 0.98 | 0.73 | 0.31 | 1.80 | 0.25 |
| Carbomethoxyethyl-AICAR-3':5'-MP | 263.5 | 223.5 | 266 / 245.5 | 254 / 219.5 | 264.5 | | 0.81 | 0.60 | 0.20 | 0.98 | 0.73 | 0.34 | 0.92 | 0.75 |
| n-Propionamido-carboxyethyl-AICAR-3':5'-MP | 263.5 | 221.5 | 266.5 / 245 | 253.5 / 217.5 | 265.5 | | 0.81 | 0.61 | 0.19 | 0.98 | 0.79 | 0.35 | 0.86 | 0.78 |
| Sulphoxypropyl-AICAR-3':5'-MP | 262.5 | 227.5 | 262 / 245 | 257 / 226 | 262.5 | 235.5 | 0.79 | 0.56 | 0.20 | 1.0 | 0.71 | 0.34 | 1.87 | 0.39 |

The new Compounds I according to the present invention and the salts thereof can be administered enterally and parenterally in liquid or solid form by admixing them with appropriate solid or liquid pharmaceutical carriers or diluents. As an injection medium, it is preferred to use water which contains the additives usual for injection solutions, such as stabilizing agents, solubilizing agents and buffers. Additives of this type include, for example, tartrate and borate buffers, ethanol, complex-forming agents, such as ethylene-diamine-tetraacetic acid and the non-toxic salts thereof, high molecular weight polymers, such as liquid polyethylene oxide for the regulation of the viscosity. Solid carrier materials which can be used include, for example, starch, lactose, mannitol, methyl-cellulose, talc, highly dispersed silicic acid, high molecular weight fatty acids, such as stearic acid, gelatine, agar-agar, calcium phosphate, magnesium stearate, animal and vegetable fats, solid high molecular weight polymers, such as polyethylene glycols; for oral administration, the compositions can, if desired, also contain flavoring and sweetening agents.

The dosage of the novel compounds of the present invention suitable for the treatment of hyperlipemia is dependent principally on the age, weight and condition of the patient being treated. One preferable form of administration is via the oral route in connection with which dosage units containing, e.g., 10 to 1000 milligrams of active compound in combination of a suitable pharmaceutical diluent are employed. One or two unit dosages may be administered from one to four times a day.

It will be understood that the specification and examples are illustrative but not limitative of the present invention and that other embodiments within the spirit and scope of the invention will suggest themselves to those skilled in the art.

What is claimed is:

1. Imidazole-ribosyl cyclophosphate compound of the formula:

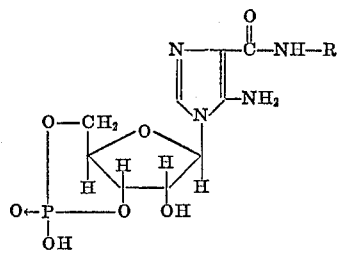

wherein

R is hydrogen or $(CH_2)_n-A$, in which n is 2 or 3,

A is sulfo or COR' and

R' is hydroxyl, alkoxy containing up to 6 carbon atoms, or propionamido;

and the pharmacologically acceptable salts thereof.

2. Compound as claimed in claim 1, designated 5-amino-1β-D-ribosyl-4-imidazole carboxamide-3':5'-monophosphate.

3. Compound as claimed in claim 1, designated carboxyethyl-5-amino-1β-D-ribosyl - 4 - imidazole carboxamide-3':5'-monophosphate.

4. Compound as claimed in claim 1, designated carboxypropyl - 5 - amino - 1β - D-ribosyl-4-imidazole carboxamide-3':5'-monophosphate.

5. Compound as claimed in claim 1, designated sulfoxypropyl - 5 - amino-1β-D-ribosyl-4-imidazole carboxamide-3':5'-monophosphate.

6. Compound as claimed in claim 1, designated carbomethoxyethyl - 5 - amino-1β-D-ribosyl-4-imidazole carboxamide-3':5'-monophosphate.

7. Compound as claimed in claim 1, designated propionamidocarboxyethyl - 5 - amino-1β-D-ribosyl-4-imidazole carboxamide-3':5'-monophosphate.

References Cited
UNITED STATES PATENTS 3,300,479   1/1967   Hanze ---------- 260—211.5 R
3,627,753   12/1971  Posternak ------ 260—211.5 R LEWIS GOTTS, Primary Examiner J. R. BROWN, Assistant Examiner U.S. Cl. X.R.

424—180